United States Patent [19]
Jeffers

[11] Patent Number: 4,908,724
[45] Date of Patent: Mar. 13, 1990

[54] DUAL GAP CROSS-FIELD MAGNETIC RECORDING HEAD WITH SINGLE GAP SIGNAL EXCITATION

[75] Inventor: Frederick J. Jeffers, Escondido, Calif.

[73] Assignee: Eastman Kodak Company, Rochester, N.Y.

[21] Appl. No.: 254,760

[22] Filed: Oct. 7, 1988

[51] Int. Cl.⁴ .......................... G11B 5/17; G11B 5/265
[52] U.S. Cl. .................................... 360/123; 360/121
[58] Field of Search ............... 360/123, 110, 118, 119, 360/121

[56] References Cited

U.S. PATENT DOCUMENTS 4,787,002 11/1988 Isozaki ............................ 360/123

FOREIGN PATENT DOCUMENTS 1055840 4/1952 Fed. Rep. of Germany ...... 360/121
0029828 3/1981 Japan .................................. 360/121
0098124 6/1982 Japan .................................. 360/121

Primary Examiner—Stuart N. Hecker
Assistant Examiner—David J. Severin
Attorney, Agent, or Firm—Daniel Robbins

[57] ABSTRACT

In a recording system utilizing a cross-field head, rather than excite both the field gap and the recording gap with signal and bias excitation as taught in the prior art, the present invention teaches applying bias excitation to both the field gap and the recording gap (as known in the prior art), but applying the signal excitation solely to the recording gap. By following this teaching of the invention, the record zone length is decreased to allow shorter wavelength recording, while the short wavelength recorded signal level is increased by effectively eliminating opposing recorded regions of magnetization in the vertical signal component.

3 Claims, 4 Drawing Sheets

DUAL GAP CROSS-FIELD MAGNETIC RECORDING HEAD WITH SINGLE GAP SIGNAL EXCITATION

BACKGROUND OF THE INVENTION

1. Field of the Invention

This invention relates in general to biased magnetic recording, and in particular to a biased cross-field recording head having increased short wavelength recording effectiveness.

The invention, as well as the prior art, will be described with reference to the figures, of which:

FIG. 1 is a drawing of the field contours defining the record zone of a prior art magnetic head, FIG. 2 is a drawing of a cross-field magnetic head, known in the prior art, shown connected to a recording system, FIG. 3 illustrates the bias field contours emanating from the gaps of a cross-field head known in the art, FIG. 4 is a drawing of the record zone of a prior art cross-field head, FIG. 5 is a graph of the vertical and longitudinal components of the signal field along a magnetic field contour of a prior art cross-field head, FIG. 6 is a drawing of a cross-field head according to the teaching of the present invention, and FIG. 7 is a graph of the vertical and longitudinal components of the signal field along a magnetic field contour of the cross-field head of the present invention.

2. Description of the Prior Art

The ongoing trend in magnetic recording is the recording of shorter and shorter wavelengths for increased data storage. While many parameters of both the magnetic medium and the magnetic record head determine the minimum wavelength that may be recorded, the "record zone" width is one of the most important parameters. Referring to FIG. 1, pole tips 10 comprise part of a magnetic recording head having a gap 12, juxtaposed to a magnetic tape 14. As is known in the art, such head when subjected to a bias current and a signal current gives rise to a record zone 16 wherein the resultant field from the head switches the magnetic particles of the tape 14 as the tape 14 traverses the record zone 16. It is known in the art that the record zone dimensions are established by the bias field of the head, while the remanent magnetization of the tape, after signal recording, is determined by the signal field. FIG. 1 shows magnetic field contours 18, 20 emanating from the gap 12; these contours are lines of constant magnetic field strength, where the field of contour 18 is greater than that of contour 20. The inner radius of contour 18, within which no signal recording occurs due to the strong erasure field existing close to the gap 12 generated by the bias current, defines one boundary of the record zone 16, while the outer contour 20, outside of which the recording field from the gap 12 has fallen below a value necessary to magnetically switch the particles of the tape 14, determines the outer boundary of the record zone 16. Assuming the recording of a long wavelength signal, i.e. one whose amplitude remains essentially constant over the period of time taken for a given section of the tape to traverse the record zone 16 length, L, then the recorded signal consists of essentially all the tape particles being switched within the record zone 16. On the other hand, the effect of short wavelength recording may be understood by considering the waveform 21 of FIG. 1. This waveform, whose wavelength λ is shown equal to L the length of the record zone, is the resultant signal magnetizing field experienced by a given section of the tape as it passes through the record zone 16. During its positive half cycle the higher coercivity particles of the section of tape will be magnetized in the positive direction, while during the negative half cycle the lower coercivity particles will be oppositely magnetized. It will be appreciated that the strength of the magnetizing field represented by the waveform 21 slowly decreases in magnitude across the record zone 16 as the distance from the gap 12 increases; hence, the difference in amplitude between the positive and negative portions of the waveform 21. The fields of the recorded high and low coercivity particles tend to cancel each other out, which results in a low amplitude short wavelength recorded signal.

One approach to increasing the short wavelength recording capability has been to decrease the length L of the record zone 16. In the prior art, a cross-field head which reduces the length of the record zone is described in "An X-Field Micro-Gap Head for High Density Magnetic Recording", Marvin Camras, IEEE Transactions on Audio, Vol. AU-12, No. 3, pp. 41–52, May-June 1964. Referring to FIG. 2, a cross-field head 19 consists of a magnetic structure 22 having a wide gap 24, called the field gap, followed by a narrow gap 26, called the recording gap. A signal source 28 is series connected to a bias source 30 and the sum of signal plus bias drives the coils 32, 34. The coils 32, 34 and the bias source 30 are so phased that the resultant bias field components from the two coils are in the same direction in the center element 36 of the magnetic structure 22. It will be understood that both signal fields and bias fields appear at both of the gaps 24, 26.

Referring to FIG. 3, bias field contours 38 originating in the recording gap 26, and bias field contours 40 originating in the field gap 24 are shown for the cross-field head of the prior art. It is known in the art that recording occurs at the trailing edge of the recording gap 26; i.e. in the region 42 of the gap 26 last "seen" by a section of tape as it traverses the head. In this region 42, the bias field contours 40 are opposite in direction from those of the contours 38, and the record zone is determined by the superposition of these component bias fields. Referring to FIG. 4, the resultant record zone 16' shape has been considerably modified; in particular, the width of the zone 16' is very narrow at the surface of the pole 10' at the trailing edge of the recording gap 26'. (In the drawings, different but related elements are identified with the same reference characters, albeit that corresponding elements in the various drawings are distinguished by the use of primes.) It is also known in the art that short wavelength signal recording predominantly takes place in a thin layer of magnetizable tape particles near the tape surface in contact with the head. From FIG. 4 it is apparent that the considerable reduction of the record zone width at the trailing edge of the gap 26' of the cross-field head meets the condition for improved short wavelength recording capability: the record zone length is greatly reduced at the trailing edge of the recording gap and this reduced record zone length is desirably at the surface of the head where short wavelength recording occurs.

Referring again to FIG. 2, it will be recalled that in the cross-field head of the prior art the field gap 26 and recording gap 24 are both excited with the bias excitation 30 and with the signal source 28. As previously described, the narrowing of the record zone is effected by the opposing bias fields originating in the dual gaps of the head. Similarly, in the prior art, the magnetic fields due to the signal excitation from the field gap and the recording gap are opposed and tend to detrimentally reduce the total signal flux available from the tape. This effect may be appreciated by considering FIG. 5, where for a typical field contour within the cross-field record zone, such as contour 43 of FIG. 4, the recorded signal field is graphed in terms of its vertical component Hy and horizontal component Hx as a function of distance "y" above the head surface contacting the tape. The plotted data is for a contour of 860 oersteds recorded by a system configured as shown in FIG. 2, having a cross-field head with the following characteristics: recording gap length =0.25 microns, field gap length =2 microns, distance between gap centers =2.5 microns, wide gap winding 34=8 turns, and narrow gap winding 32=1 turn. The current through windings 32, 34 provides gap fields of 3000 oersteds in each of the field gap and the recording gap. It is known in the art that 90% of the signal detected from a recorded tape having a recorded wavelength emanates from the top λ/2.7 of the recorded layer. For a short wavelength signal of 0.68 microns, the depth of recording is therefore about 0.25 microns. Referring again to FIG. 5, it is seen that the direction of the vertical component Hy changes sign at a distance of about 0.13 microns into the tape. As indicated above, the 0.68 micron wavelength recording extends 0.25 microns into the tape, therefore, about half the recorded vertical component Hy is positive (region 44 from a depth of 0 to 0.13 microns into the tape), while the remaining half (region 46 from a depth of 0.13 to 0.25 microns) is negative; these fluxes oppose each other resulting in diminished signal available on playback from the vertical magnetization component.

SUMMARY OF THE INVENTION

In a recording system utilizing a cross-field head having a uniform core thickness in the trackwise direction transverse to the direction of tape motion, rather than excite both the field gap and the recording gap with signal and bias excitation as taught in the prior art, the present invention teaches applying bias excitation to both the field gap and the recording gap (as known in the prior art), but applying the signal excitation solely to the recording gap. By following this teaching of the invention, the record zone length is decreased to allow shorter wavelength recording, while the short wavelength recorded signal level is increased by effectively eliminating opposing recorded regions of magnetization in the vertical signal component.

DETAILED DESCRIPTION

Figure 6:
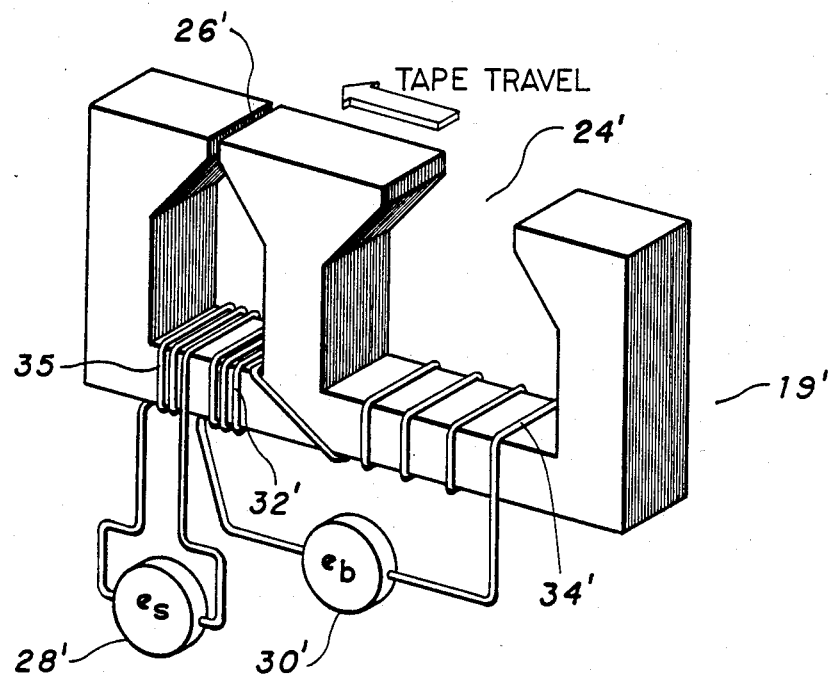

Referring to FIG. 6, a cross-field head 19' having a uniform core thickness in the trackwise direction transverse to the direction of tape motion, fabricated according to the teaching of the invention, has three windings 32' 34' and 35 thereon. In the recording system illustrated in FIG. 6, windings 32' and 34' are connected to a bias source 30', and effect a narrowing of the recording zone as previously explained. In the practice of the invention, a signal source 28' is applied solely to the winding 35 whereby the narrow recording gap 26' is excited by the signal, while the wide field gap 24' is not.

An embodiment of a cross-field head according to the invention comprises the following parameters: Wide gap 24' length =2 micron, narrow gap 26' length =0.25 micron, distance between wide gap 24' and narrow gap 26'=2.5 micron, bias field windings; wide gap winding 34'=8 turns, narrow gap winding 32'=1 turn, signal winding 35=1 turn.

Figure 1:
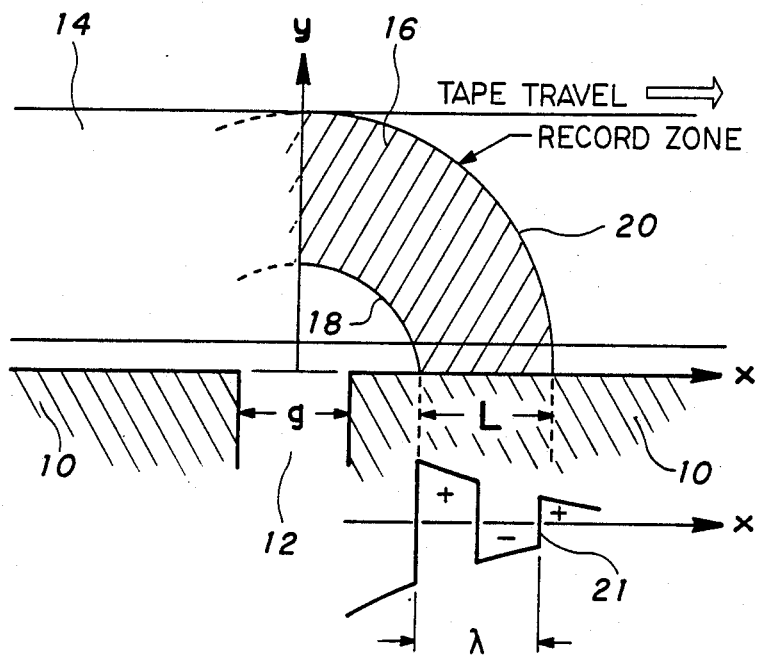
Figure 2:
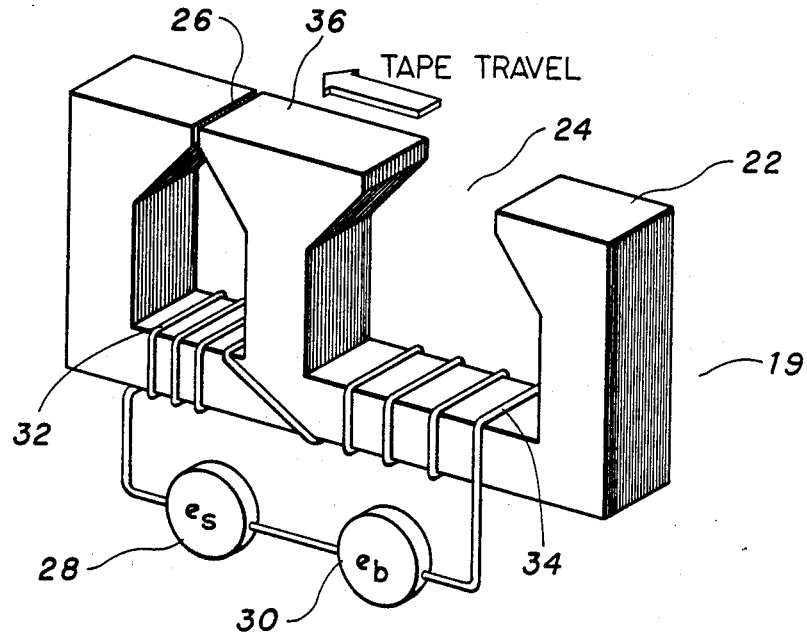
Figure 3:
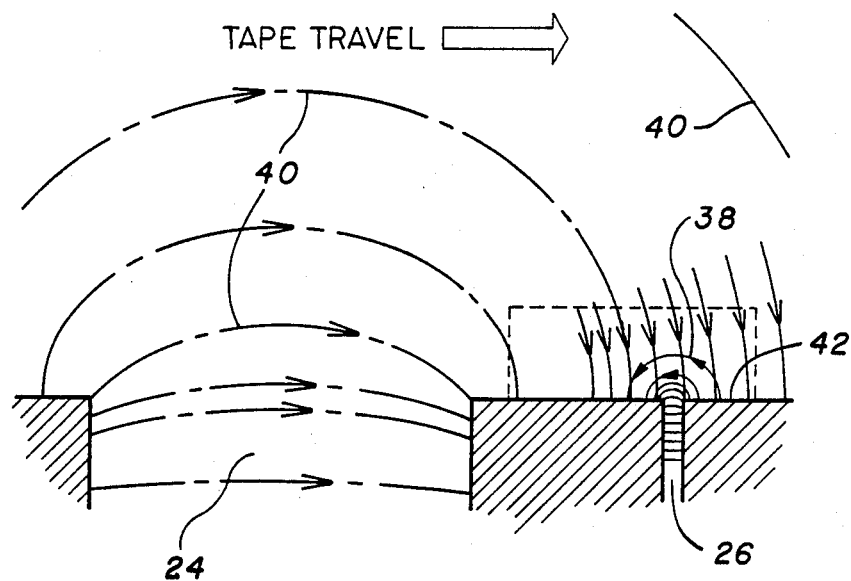
Figure 4:
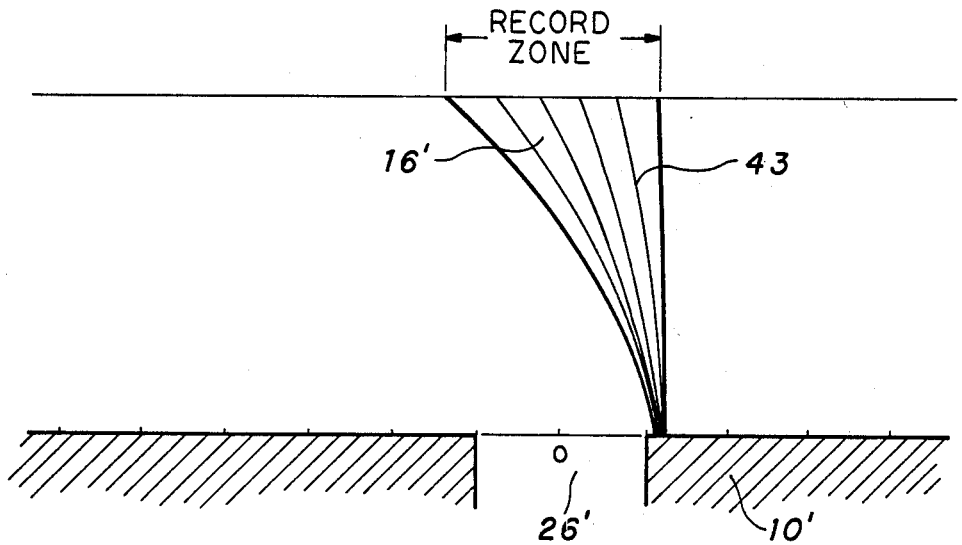
Figure 5:
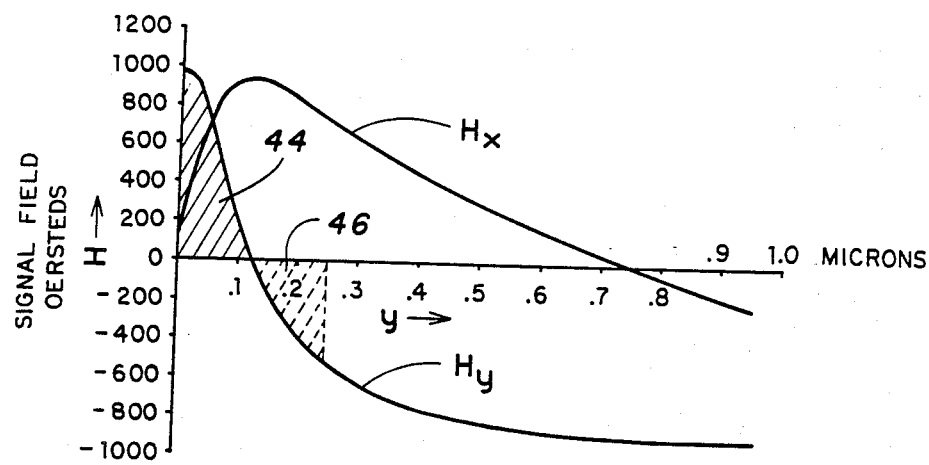
Figure 7:
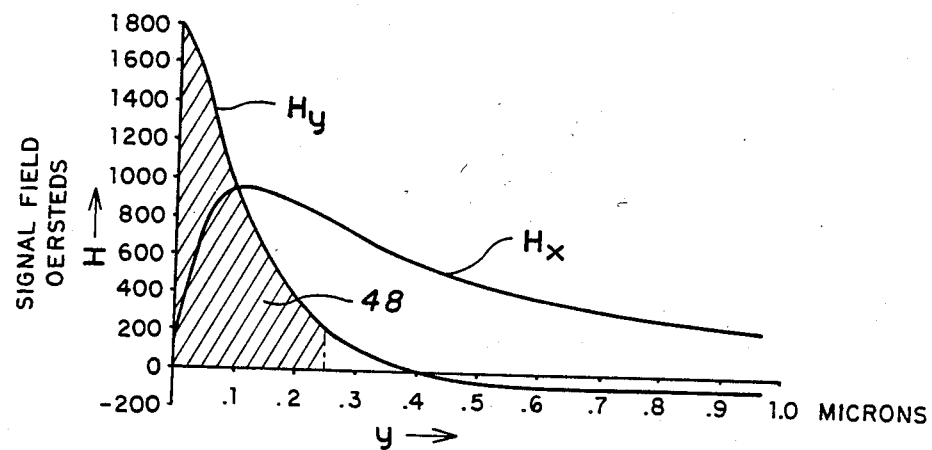

By consideration of FIG. 7, the improved recording performance of a cross-field head according to the invention may be contrasted with that of the comparable head of the prior art as previously described (FIG. 5). Referring to FIG. 7, it is seen that the sign of the recorded signal field remains positive out to a depth of about 0.4 microns into the tape. The field in the region 48, out to a depth of 0.25 microns, is entirely of positive sign. The short wavelength response for the 0.68 micron wavelength signal previously considered is enhanced over that attained in the prior art since there is no field reversal in the volume of tape important in short wavelength recording.

The invention has been described in detail with particular reference to preferred embodiments thereof, but it will be understood that variations and modifications can be effected within the spirit and scope of the invention.

What is claimed is:
1. An improved cross-field head adapted for recording on a moving magnetic tape, said head having a magnetic structure of uniform core thickness in the trackwise direction transverse to the direction of motion of said tape, said core including a wide gap and a narrow gap for contacting said magnetic tape, said structure having first and second coils adapted for magnetically exciting said wide gap and said narrow gap respectively by means of a biasing source, whereby bias fields are provided at said wide gap and said narrow gap, said bias fields determining a record zone in the region of said narrow gap, the improvement comprising:
 (a) means for magnetically exciting said narrow gap by a signal source, whereby said means for magnetically exciting said narrow gap in combination with said first coil and said second coil effects recording of said signal in said tape.

2. The cross-field head of claim 1 wherein said means for magnetically exciting said narrow gap is an electrical coil magnetically coupled to said narrow gap.

3. An improved apparatus for magnetic recording, said apparatus comprising:
 (a) a cross-field head magnetic structure of uniform core thickness in the trackwise direction transverse to the direction of a cooperative moving magnetic tape, said core having a narrow gap and an adjacently located wide gap,
 (b) a first winding magnetically coupled to said narrow gap,
 (c) a second winding magnetically coupled to said wide gap, said second winding being series connected to said first winding, said first and second windings adapted for excitation by a biasing source, and
 (d) a third winding mangetically coupled to said narrow gap, said third winding adapted for excitation by a signal source for signal recording.

* * * * *